(12) United States Patent
Yeager

(10) Patent No.: US 10,620,098 B2
(45) Date of Patent: Apr. 14, 2020

(54) APPARATUS AND METHODS FOR TESTING COMPONENTS UNDER FORCE

(71) Applicant: Covestro LLC, Pittsburgh, PA (US)

(72) Inventor: Mark A. Yeager, McKees Rocks, PA (US)

(73) Assignee: Covestro LLC, Pittsburgh, PA (US)

( * ) Notice: Subject to any disclaimer, the term of this patent is extended or adjusted under 35 U.S.C. 154(b) by 216 days.

(21) Appl. No.: 15/646,367

(22) Filed: Jul. 11, 2017

(65) Prior Publication Data

US 2019/0017910 A1    Jan. 17, 2019

(51) Int. Cl.
| | | |
|---|---|---|
| *G01N 3/00* | (2006.01) | |
| *G01N 3/02* | (2006.01) | |
| *G01N 3/56* | (2006.01) | |
| *G01N 3/08* | (2006.01) | |
| *G01N 17/00* | (2006.01) | |
| *G01M 99/00* | (2011.01) | |

(52) U.S. Cl.
CPC ............ *G01N 3/02* (2013.01); *G01M 99/007* (2013.01); *G01N 3/08* (2013.01); *G01N 3/567* (2013.01); *G01N 17/002* (2013.01); *G01N 2203/0019* (2013.01); *G01N 2203/0274* (2013.01)

(58) Field of Classification Search
CPC .. G01N 3/02; G01N 3/08; G01N 3/14; G01N 3/567; G01N 17/002; G01N 2203/0003; G01N 2203/0019; G01N 2203/0037; G01N 2203/006; G01N 2203/0062; G01N 2203/0236; G01N 2203/024; G01N 2203/0252; G01N 2203/0274; G01N 2203/0447; G01N 2203/0464; G01N 2203/0476

See application file for complete search history.

(56) References Cited

U.S. PATENT DOCUMENTS

| | | |
|---|---|---|
| 1,702,603 A | 2/1929 | Hardin et al. |
| 1,811,210 A | 6/1931 | Tinius |
| 1,825,954 A | 10/1931 | Hardin et al. |
| 2,226,600 A | 12/1940 | Eddington |
| 2,791,120 A | 5/1957 | Dietert et al. |
| 2,976,723 A | 3/1961 | Eddy |
| 3,464,260 A | 9/1969 | Heyman |
| 3,757,566 A | 9/1973 | Flury |
| 4,236,413 A | 12/1980 | Schmid et al. |
| 4,691,576 A | 9/1987 | Schleuniger et al. |
| 6,178,822 B1 | 1/2001 | Manning |
| 7,640,847 B2 | 1/2010 | Iyengar et al. |
| 9,557,256 B2 | 1/2017 | Seok et al. |
| 2018/0292301 A1 * | 10/2018 | Hou .................. G01N 3/02 |

FOREIGN PATENT DOCUMENTS

| | | | | |
|---|---|---|---|---|
| GB | 1022478 A | * | 3/1966 | ........... F16J 15/3296 |
| GB | 1123213 A | * | 8/1968 | ............... G01N 3/14 |
| GB | 2160161 A | | 12/1985 | |

* cited by examiner

*Primary Examiner* — Blake A Tankersley
(74) *Attorney, Agent, or Firm* — Richard P. Bender

(57) ABSTRACT

An apparatus and methods for testing components under force is described herein. The apparatus comprises cap bolts that may be tightened to exert a measurable, constant force upon a lever arm that rotates about a fulcrum. The lever arm pushes down upon a push rod, to exert a force upon a test piece in an insertion well, which may be filled with fluid. The fulcrum may be positioned, such that the force from the cap bolt gives a magnifying, or a diluting force, upon the push rod.

10 Claims, 9 Drawing Sheets

APPARATUS AND METHODS FOR TESTING COMPONENTS UNDER FORCE

FIELD

This specification relates to an apparatus and methods for testing solid components under force.

BACKGROUND

Luer fittings and Luer connectors are used in the medical industry, among others, to provide leak-free connections for fluids that must travel through multiple components to reach their desired destination. Such fittings and connectors typically have a male component, which has a fluid-carrying tube that fits into an opening of a female component of a Luer fitting or connector. There is typically a portion of each component that is designed to screw into a portion of the other component. Alternatively, such components may be held together by friction alone. Such fittings are tapered, and designed to fit inside or outside another fitting. In either case, there is a force that is placed upon such Luer fittings and connectors when connected to one another. The material of construction must be both flexible enough to attach to one another, and durable enough to withstand such force, for an extended period of time.

A wide variety of fluids may pass through Luer fittings and connectors, ranging from water, to saline solution, blood plasma, and medications. Some of these fluids may even degrade materials used in the Luer connectors, breaking them down over time, and eventually leading to small fissures or even cracks in the material. Such material failures may lead to a loss of containment of the fluid.

Plastic and other material suppliers who provide the materials that are used for Luer fittings and connectors must test their materials, in connection with such fluids, to determine the materials' compatibility. Typical methods include soaking a piece of the material in the fluid. However, such a method does not approximate the force such materials must withstand when they are used in association with such fluids. A soaking test without any force may not identify if and when the materials may experience cracking or fissures, much less where such cracking or fissures may occur.

A test of Luer fittings and connectors, which are connected together while a fluid passes through them, may also not be a reliable test. While such fittings and connectors are tightened to form the connection, the force with which the fittings and connectors press together varies due to frictional difference between plastics, the design of the collar threads, the outside diameter of the collar, and inadequate repeatability in the torque screw drivers, among other factors. This variability makes comparisons between different materials and different Luer designs extremely difficult.

Thus, there is a need to test such fittings and connectors, under a constant force, and in standardized conditions, to test the effect of fluids upon Luer fittings and connectors, for different materials of construction. The present invention has been made in view of the foregoing need.

SUMMARY

In an embodiment, test fixture apparatus comprises: a fulcrum; a lever arm having a first part and a second part; an adjustable force delivery tool, positioned to deliver force against the first part of the lever arm; a push rod having a first end and a second end, positioned to receive a force at the first end, that is delivered from the second part of the lever arm; wherein the fulcrum is located in between the first part of the lever arm and the second part of the lever arm, and wherein the lever arm turns about the fulcrum.

In another embodiment, the fulcrum may be a bar, about which a plurality of levers rotate. In a different embodiment, the adjustable force delivery tool may be a bolt, which in turn may be threaded in yet another embodiment. In still another embodiment, the second end of the push rod is inserted into a test piece. In yet another, the test fixture apparatus further comprises an insertion well located below at least a portion of the push rod. In another different embodiment, the insertion well comprises a liquid.

In more embodiments, second end of the push rod is inserted into a test piece located inside the insertion well. In different embodiments, the fulcrum is closer to the adjustable force delivery tool than it is to the push rod, while in other embodiments, the fulcrum is farther away from the adjustable force delivery tool than it is from the push rod. In yet another embodiment, the test fixture apparatus further comprises a removable part holder. In another embodiment still, the removable part holder comprises an insertion well located below at least a portion of the push rod.

In an embodiment not yet disclosed, a method for measuring ability to withstand force comprises: placing a test piece on a surface; selecting the force to be applied upward using an adjustable force delivery tool; applying the upward force upon a first part of a lever, wherein the lever has a first part and a second part, and a fulcrum is located between the first part and the second part, and wherein the lever rotates about the fulcrum; the second part of the lever applying a downward force upon the test piece; maintaining such force for a fixed amount of time; removing the test piece from the downward force; and observing the test piece for cracks or fissures.

In additional embodiments, the adjustable force delivery tool is a bolt. In another embodiment, the fulcrum is closer to the adjustable force delivery tool than it is to the location along the lever where the downward force is placed upon the test piece. In a different embodiment, the fulcrum is farther away from the adjustable force delivery tool than it is from the location along the lever where the downward force is placed upon the test piece. In still another embodiment, the method further comprises the step of submerging a portion of the test piece in liquid, before force is applied to it.

BRIEF DESCRIPTION OF THE DRAWINGS

Various features and characteristics of the inventions described in this specification may be better understood by reference to the accompanying figures, in which.

Figure 1:
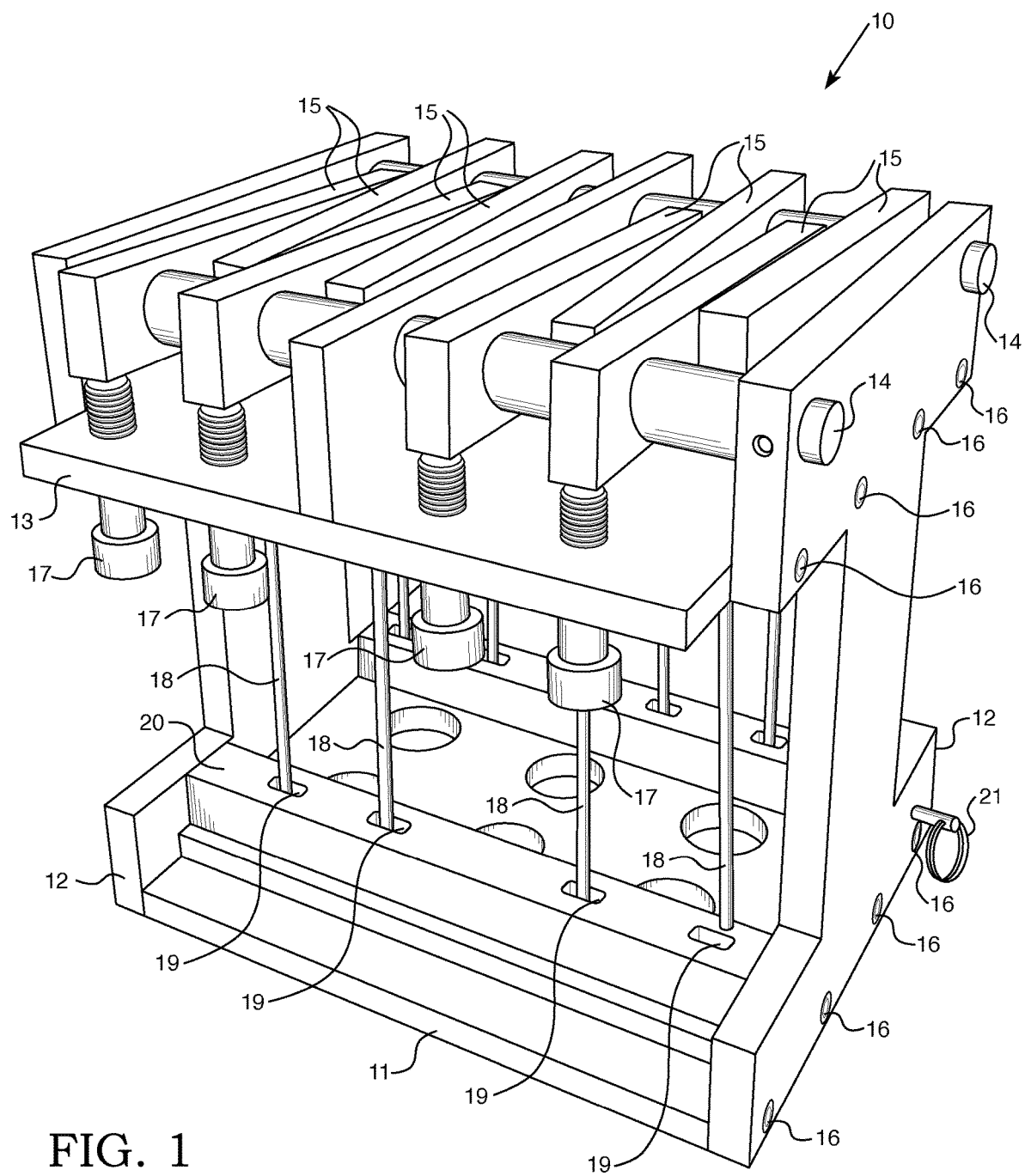
FIG. 1 is a front perspective view of a test fixture.
Figure 2:
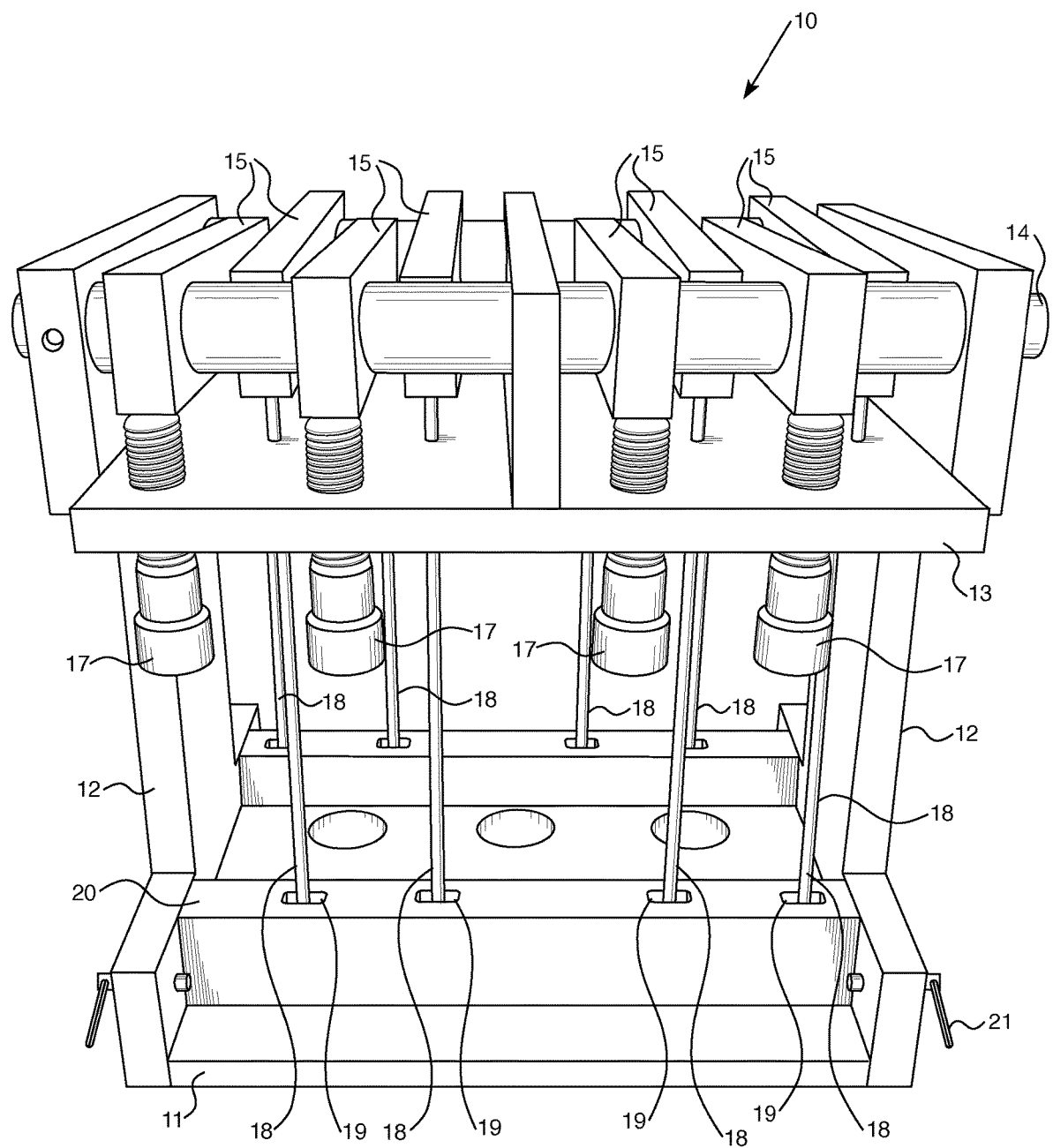
FIG. 2 is another front perspective view of the test fixture shown in FIG. 1.
Figure 3:
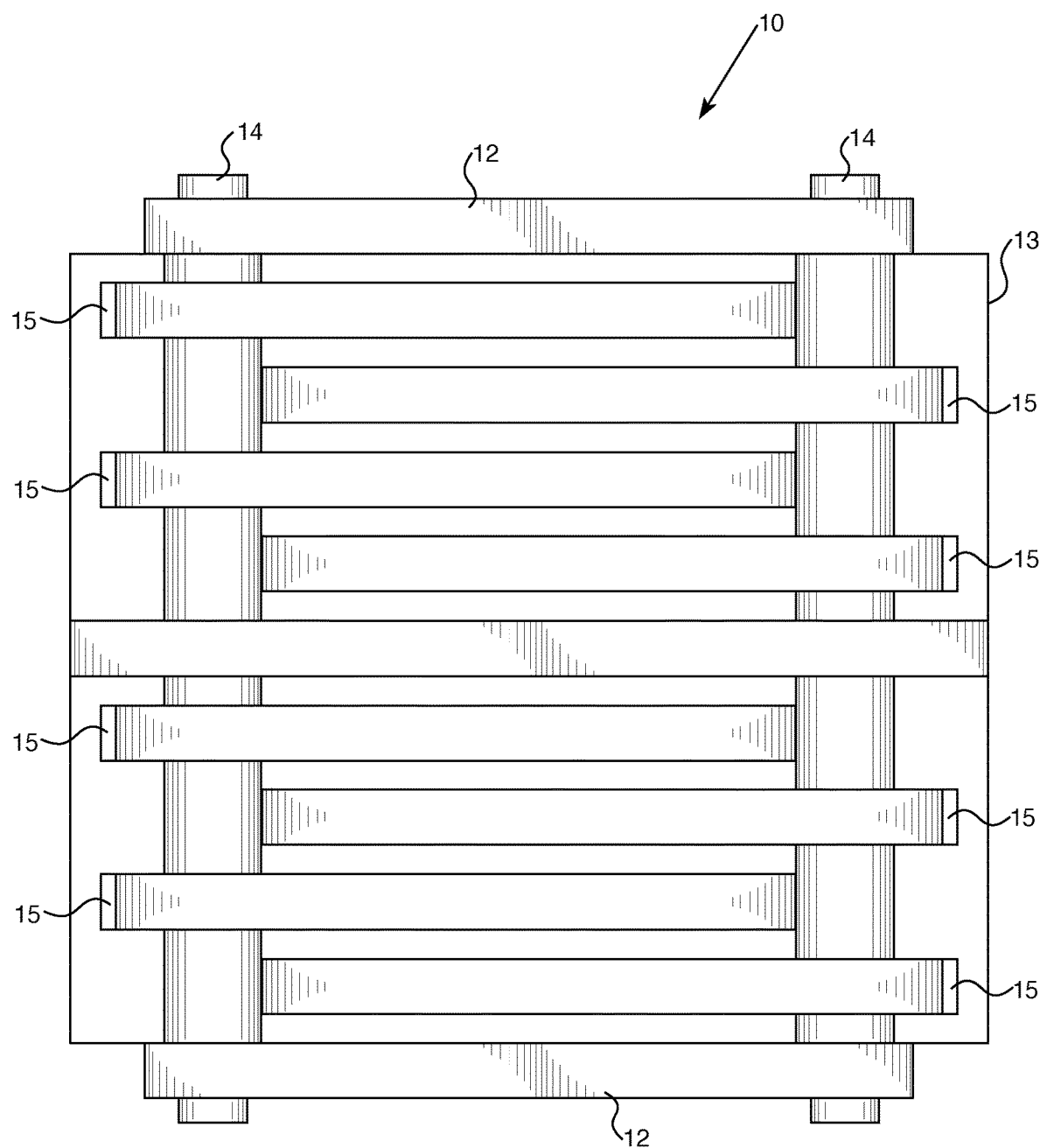
FIG. 3 is a top view of the test fixture shown in FIG. 1.
Figure 4:
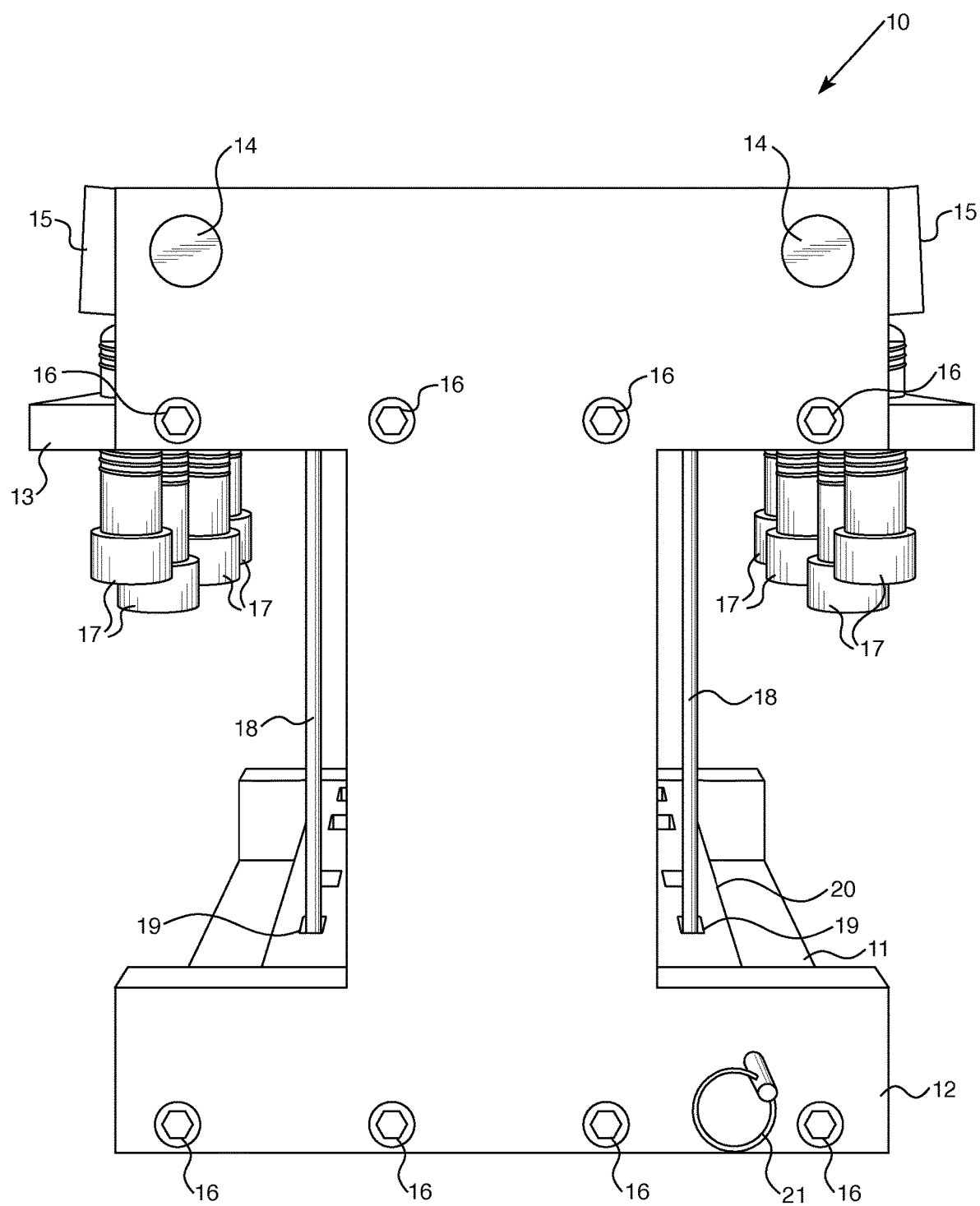
FIG. 4 is a side view of the test fixture shown in FIG. 1.
Figure 5:
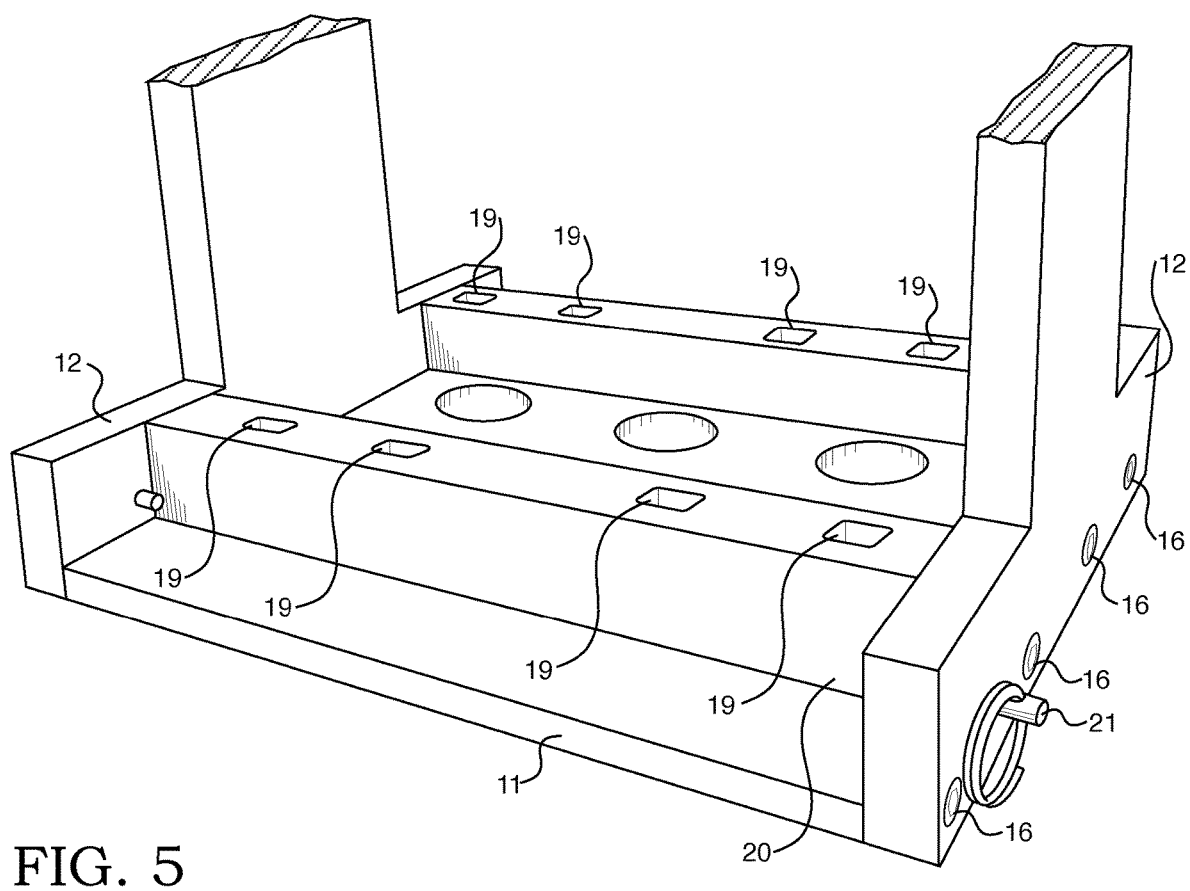
FIG. 5 is a front perspective view of the part holder and a cut away portion of the side brackets of the test fixture shown in FIG. 1.

The reader will appreciate the foregoing features and characteristics, as well as others, upon considering the following detailed description of the inventions according to this specification.

DETAILED DESCRIPTION

A test fixture described herein provides for a standardized means for testing the chemical resistance of certain plastics used in Luer fittings and connectors for various fluids used in medical and other applications. Luer fittings often place the female Luer (with a receiving cone) under considerable hoop stress, which can reduce chemical resistance. Metal rods in the test fixture have ends with the shape of a male Luer connector, which can be inserted into the female Luer connector while the part is immersed in the test liquid. The bolt and lever mechanism allows the male Luer rod to be inserted into the female Luer with a known force which can range from the typical Luer fitting force of about 30 lbs force (133 Newtons) up to about 100 lbs force (445 Newtons) to accelerate a simulated chemical attack on the Luer fitting or connector, which allows for faster testing. The use of the metal push rod as a male Luer substitute eliminates the plastic-to-plastic frictional differences which can make comparisons between plastics difficult.

While the foregoing description is made to test plastic Luer fittings and connectors in liquid, it is recognized that the test fixture and methods described herein, may be used to test other materials, and under other conditions, as well.

As shown in FIGS. 1-5, test fixture 10 includes base 11, two side brackets 12, a top bracket 13, fulcrum bars 14, levers 15, bracket bolts 16, cap bolts 17, push rods 18, insertion wells 19, part holder 20 and pin 21. Side brackets 12 are attached by one or more bracket bolts 16 to base 11. Bracket bolts 16 are also used to connect side brackets 12 to top bracket 13. Side brackets 12 also include openings to support one or more fulcrum bars 14, which may freely rotate in the opening. Top bracket 13 may also include an opening to support fulcrum bars 14. Top bracket 13 also comprises threaded openings to receive cap bolts 17. Part holder 20 comprises at least one insertion well 19, in which a test piece will be inserted for testing. Thus, the insertion well should be appropriately sized to accommodate the test piece, such that it may be completely submerged in, and surrounded by, fluid in the insertion well. Part holder 20 slides freely above base 11 and between side brackets 12. It is held in place by pin 21, which is inserted through side bracket 12, and into part holder 20. Part holder 20 may slide away from the remainder of test fixture 10, after pin 21 is removed.

Cap bolt 17 may be turned, or tightened, at one end, which will make it rise higher relative to top bracket 13, such that it applies an upward force to lever arm 15, which rotates about fulcrum bar 14. Because of the position of lever arm 15 about fulcrum bar 14, an upward force from cap bolt 17 results in a downward force from lever arm 15 upon push rod 18, which is located at the opposite end of lever arm 15. In the embodiment shown in FIGS. 1-5, fulcrum bar 14 is closer to cap bolt 17, than it is to push rod 18. This positioning offers a mechanical disadvantage to deliver a diluted force upon push rod 18. However, such positioning also offers better control upon how much force is applied by cap bolt 17. Furthermore, there is less variation, or noise, in the force that is delivered through push rod 18.

Part holder 20 may have one or multiple insertion wells 19. Multiple insertion wells allow for testing multiple test pieces simultaneously. The insertion wells should be sized to accommodate whatever pieces will undergo testing. Insertion wells 19 may further comprise holders, to facilitate placing the test pieces and fluid inside the insertion wells. The holders slide into the base of the tester and may be held in with two push clips. The holders can be removed to empty fluid from the insertion wells and to facilitate cleaning.

Figure 6:
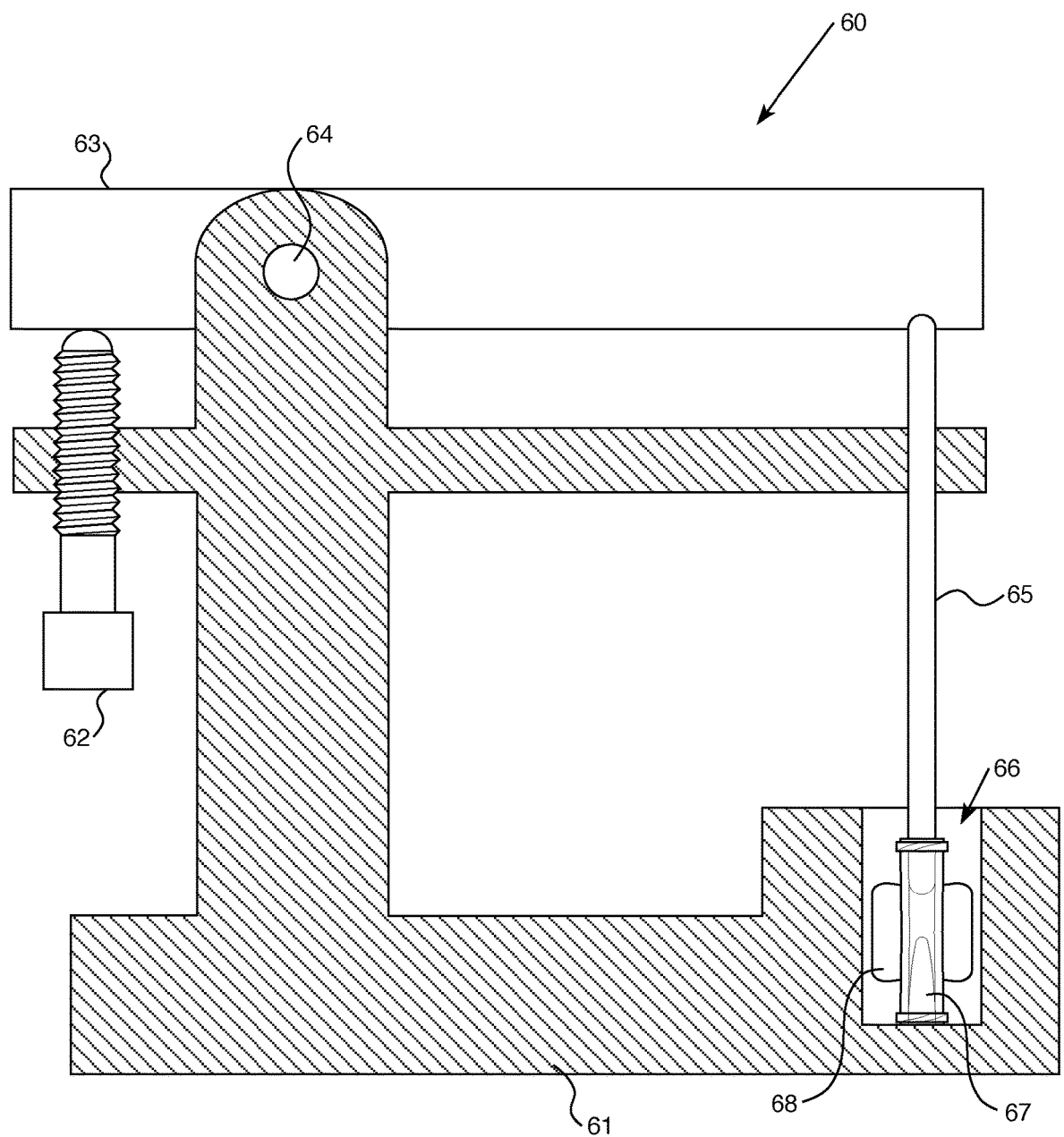
FIG. 6 is a depiction showing how the moveable parts contact each other in a test fixture.

As shown in FIG. 6, test fixture 60 includes stationary part 61, which has openings for cap bolt 62, fulcrum bar 64 and push rod 65. Stationary part 61 has a threaded opening for cap bolt 62, such that when cap bolt 62 is turned, it may move up or down relative to stationary part 61. Fulcrum bar 64 is positioned closer to cap bolt 62, than to push rod 65. Thus, when cap bolt 62 is tightened such that it adds an upward force onto lever arm 63, lever arm 63 responds to add a magnified, stronger downward force upon push rod 65. Push rod 65 applies this force upon test piece 68 located in insertion well 66. At the base of insertion well 66 is centering pin 67, which is positioned to be aligned directly below push rod 65, such that test piece 68 fits into both push rod 65 and centering pin 67. Centering pin 67 is fixedly attached to stationary part 61, but does not form a seal with test piece 68. Furthermore, fluid may be added to insertion well 66 during testing, such that test piece 68 is completely submerged in the fluid while being subject to the forces applied to it by push rod 65. The downward force that is applied by push rod 65 onto test piece 68, while test piece 68 is submerged in fluid, will test how test piece 68 withstands such force upon its opening. As push rod 65 is inserted into test piece 68, fluid may be pushed out the bottom of test piece 68, next to centering pin 67.

A test fixture may be designed such that the fulcrum bar is positioned closer to, or further away from, the cap bolt that is pressing against it. This may be done by re-positioning the openings for the fulcrum bar in the side brackets, the top bracket, and the lever arm. A fulcrum bar that is closer to the cap bolt results in a diluted force being applied to the push rod, as that position presents a mechanical disadvantage for applying force. However, it has been found that such a configuration does have some advantages. First, it allows for more control over selecting a specific force within a desired range, as changes in the torque applied will result in a smaller difference in force. So a desired force is more easily applied. Also, the variation in the force that is measured from the push rod is minimized. It is believed that variation in force measurement comes from the metal-on-metal friction of the cap bolt within its threaded opening. While the amount of friction for metal-on-metal is believed to be less than metal-on-plastic or plastic-on-plastic, there remains the opportunity for friction to intermittently present itself, making repeat measured torques apply an inconsistent amount of force. When a larger variety of torque levels are used to apply the forces made by the rush rod, this difference between the applied force due to varying amounts of friction becomes less and less apparent. The frictional differences become diluted, among the wider range of applied torque.

Conversely, a magnified force may be applied to the push rod when the fulcrum bar is located closer to the push rod. This position offers a mechanical advantage. However, it can be more difficult to select a particular force, and the effect of metal-on-metal friction from the movement of the cap bolts may likewise be more amplified as well. The location of the fulcrum bar about the lever arm should be selected to apply the desired amount of force relative to the force that may be applied by the tightening of the cap bolts, while further considering the importance of selecting a particular amount of force to be applied, and the effect of metal upon metal friction, which may affect what force is applied by the push rod.

Figure 7:
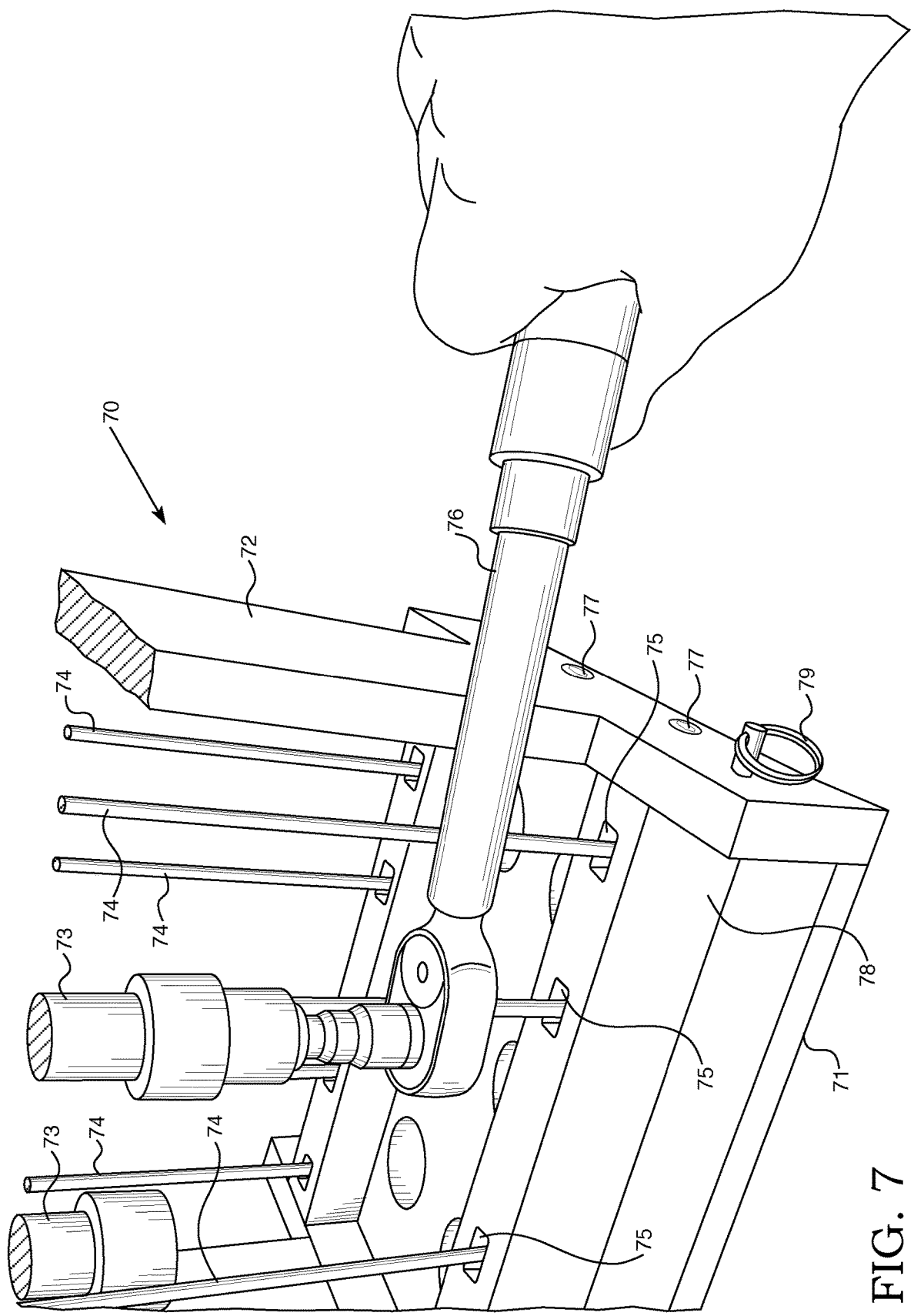
FIG. 7 is a front perspective view of a portion of a test fixture, where the cap bolts are being tightened to apply a specific force.

As shown in FIG. 7, cap bolts 73 of test fixture 70 may be tightened by torque wrench 76, which may be adjusted to apply a particular torque upon cap bolt 73. This same torque can then be applied to other cap bolts 73, to ensure a consistent torque that is applied during testing, across different cap bolts 73, such that there is also a consistent force that is applied by push rods 74 to test pieces (not shown). Also shown in FIG. 7 are a cut away portion of test fixture 70, including base 71, side bracket 72, insertion wells 75, bracket bolts 77, part holder 78 and pin 79.

Figure 8:
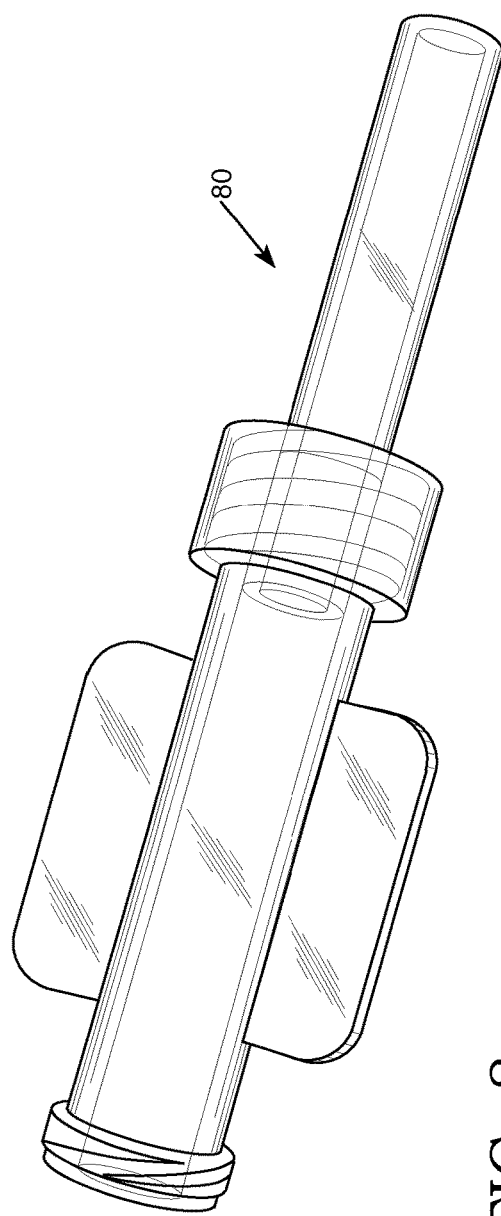
FIG. 8 is a perspective view of a connected Luer fitting.
Figure 9:
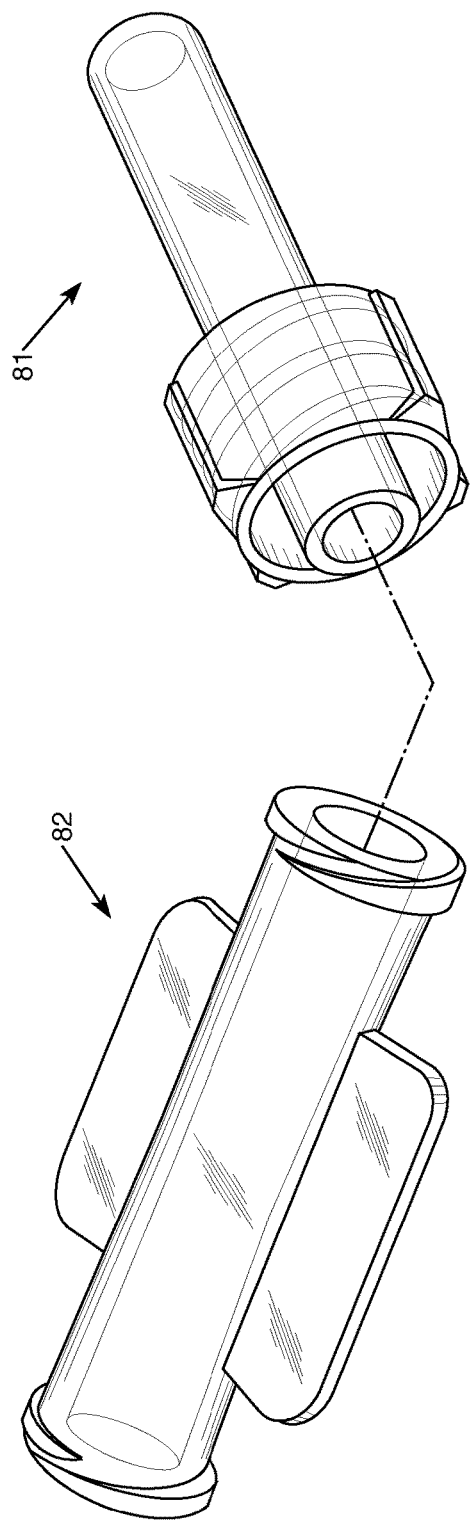
FIG. 9 is a perspective view of a female Luer connector and a male Luer connector.

As shown in FIGS. 8-9, male Luer connector 81 fits inside female Luer connector 82. There is a screw type fitting, such that after the parts are fitted together, a person connecting the pieces would grasp male Luer connector 81 and turn it about female Luer connector 82, to screw the pieces together to form connected Luer fitting 80.

Figure 10:
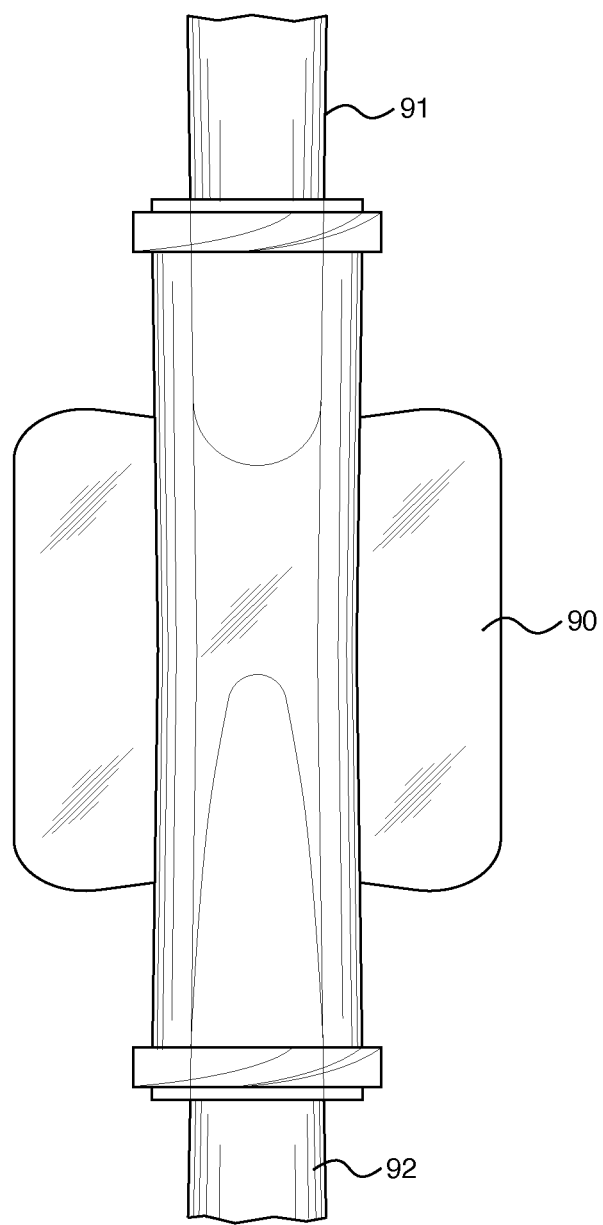
FIG. 10 is a front view of a female Luer connector, attached to a push rod at one end, and a tapered male fitting at the other end.

FIG. 10 depicts female Luer connector 90 as a test piece inside an insertion well of a test fixture (not shown). Push rod 91 applies a downward force upon female Luer connector 90, which is held into place by centering pin 92. Push rod 91 is tapered to approximate the tapered shape of a male Luer connector.

The actual force applied by the push rod, or exertion force, may be measured by a force gauge with a pressure transducer, such as one available from Imada, Inc. of Northbrook, Ill., USA. The pressure transducer may be placed beneath the end of the rod during calibration to measure the actual force that is applied by the push rod when a torque is applied to a cap bolt. A specific torque may be applied by a torque wrench as described above. The corresponding force exerted by the push rod is then measured, and noted. The force applied by the torque wrench is then changed, and then a different corresponding exertion force is then measured. This process is then repeated, across the range of desired forces, and also taking into account the limits of the force gauge, as too large of an exertion force may damage the pressure transducer. Table 1 is an example of torque forces that are applied to a cap bolt, and its corresponding exertion force applied by the push rod. The torque was measured in in-lbs; the exertion force was measured in lbs force. The corresponding measurement is listed in SI units, in parenthesis as shown below:

TABLE 1

| Tightening Torque (in-lbs) | Exertion Force (lbs force) |
|---|---|
| 25 (2.83 N-m) | 45 (200 N) |
| 30 (3.39 N-m) | 55 (245 N) |
| 35 (3.95 N-m) | 65 (289 N) |
| 40 (4.52 N-m) | 75 (334 N) |
| 45 (5.08 N-m) | 85 (378 N) |
| 50 (5.65 N-m) | 95 (423 N) |

Before testing, the part holder is removed from the rest of the test fixture as described above. Test pieces are placed into the insertion wells, on the centering pins. The part holder is then replaced into the test fixture, and the pin is inserted to keep the part holder in place. Fluid is then added to the insertion wells, to submerge the test pieces. The push rods are then inserted through the holes in the top bracket, and into the test pieces. The lever arms are then rotated to rest upon the push rods. The cap bolts are then turned, or tightened, to rise up to touch the lever arm. A torque wrench is used to apply the desired amount of torque upon the cap bolts, which then apply a force upon the lever arms. This setup may then be repeated, to allow for testing in as many insertion wells with corresponding push rods, lever arms and cap bolts, that the test fixture may have. The test pieces then remain under pressure, exposed to the test fluid, for the desired amount of time.

The time the test pieces should sit in the fluid under force will vary by substance and material. When ranking materials it is best to pick a time and range of forces that may demonstrate different results between the materials, such that the worst material may pass the lowest force (assuming it has some resistance to the fluid and exertion force) and the best material passes at higher forces. To know the limit of the best material, it is recommended to test to failure.

At the end of the exposure time, the bolts should be unscrewed to back off the force each applies to its corresponding lever arm. The lever arms should then be pivoted out of the way to allow the push rods and test pieces to be pulled up and out of the fluid. At the higher insertion forces the parts stick tightly onto the rods, so it may become necessary to grab the rods with pliers to remove them from the test pieces. To keep the applied-force time about the same for each test piece, remove each push rod in the same order in which force was applied. After the push rods have been removed from the test pieces, remove the pin, and slide the part holder away from the remainder of the text fixture. Remove the fluid and set aside the test pieces for observation of cracks or fissures.

Table 2 is an example of test results, showing the results of three different grades of polycarbonates. The test pieces that failed the test had visible cracks or fissures in the material. The different grades first showed cracks or fissures at different applied forces.

TABLE 2

| Tightening Torque (in-lbs) | Exertion Force (lbs force) | Polycarbonate 1 | Polycarbonate 2 | Polycarbonate 3 |
|---|---|---|---|---|
| 25 | 45 | Pass | Pass | Pass |
| 30 | 55 | Fail | Pass | Pass |
| 35 | 65 | Fail | Pass | Pass |
| 40 | 75 | Fail | Fail | Pass |
| 45 | 85 | Fail | Fail | Fail |
| 50 | 95 | Fail | Fail | Fail |

The following aspects are disclosed in this application:
1. A test fixture apparatus comprising:
a fulcrum;
a lever arm having a first part and a second part;
an adjustable force delivery tool, positioned to deliver force against the first part of the lever arm;
a push rod having a first end and a second end, positioned to receive a force at the first end, that is delivered from the second part of the lever arm;
wherein the fulcrum is located in between the first part of the lever arm and the second part of the lever arm, and
wherein the lever arm turns about the fulcrum.
2. The test fixture apparatus of 1, wherein the fulcrum is a bar, about which a plurality of levers rotate.
3. The test fixture apparatus of 1 or 2, wherein the adjustable force delivery tool is a bolt.
4. The test fixture apparatus of any of the preceding aspects, wherein the bolt is threaded.
5. The test fixture apparatus of any of the preceding aspects, wherein the second end of the push rod is inserted into a test piece.

6. The test fixture apparatus of any of the preceding aspects, further comprising an insertion well located below at least a portion of the push rod.

7. The test fixture apparatus of 6, wherein the insertion well comprises a liquid.

8. The test fixture apparatus of 6 or 7, wherein the second end of the push rod is inserted into a test piece located inside the insertion well.

9. The test fixture apparatus of any of the preceding aspects, wherein the fulcrum is closer to the adjustable force delivery tool than it is to the push rod.

10. The test fixture apparatus of any of the preceding aspects, wherein the fulcrum is farther away from the adjustable force delivery tool than it is from the push rod.

11. The test fixture apparatus of any of the preceding aspects, further comprising a removable part holder.

12. The test fixture apparatus of 11, wherein the removable part holder comprises an insertion well located below at least a portion of the push rod.

13. A method for measuring ability to withstand force, the method comprising: placing a test piece on a surface;
selecting the force to be applied upward using an adjustable force delivery tool; applying the upward force upon a first part of a lever, wherein the lever has a first part and a second part, and a fulcrum is located between the first part and the second part, and wherein the lever rotates about the fulcrum; the second part of the lever applying a downward force upon the test piece; maintaining such force for a fixed amount of time;
removing the test piece from the downward force; and observing the test piece for cracks or fissures.

14. The method of 13, wherein the adjustable force delivery tool is a bolt.

15. The method of 13 or 14, wherein the fulcrum is closer to the adjustable force delivery tool than it is to the location along the lever where the downward force is placed upon the test piece.

16. The method of any of 13-15, wherein the fulcrum is farther away from the adjustable force delivery tool than it is from the location along the lever where the downward force is placed upon the test piece.

17. The method of any of 13-16, further comprising the step of submerging a portion of the test piece in liquid, before force is applied to it.

What is claimed is:

1. A test fixture apparatus comprising:
a fulcrum;
a lever arm having a first part and a second part;
an adjustable force delivery tool, positioned to deliver force against the first part of the lever arm;
a push rod having a first end and a second end, positioned to receive a force at the first end, that is delivered from the second part of the lever arm;
an insertion well located below at least a portion of the push rod;
wherein the fulcrum is located in between the first part of the lever arm and the second part of the lever arm,
wherein the lever arm turns about the fulcrum and
where the insertion well comprises a liquid.

2. The test fixture apparatus of claim 1, further comprising one or more additional lever arms to form a plurality of lever arms, and wherein the fulcrum is a bar, about which the plurality of lever arms rotate.

3. The test fixture apparatus of claim 1, wherein the adjustable force delivery tool is a bolt.

4. The test fixture apparatus of claim 3, wherein the bolt is threaded.

5. The test fixture apparatus of claim 1, wherein the second end of the push rod is inserted into a test piece.

6. The test fixture apparatus of claim 1, wherein the second end of the push rod is inserted into a test piece located inside the insertion well.

7. The test fixture apparatus of claim 1, wherein the fulcrum is closer to the adjustable force delivery tool than it is to the push rod.

8. The test fixture apparatus of claim 1, wherein the fulcrum is farther away from the adjustable force delivery tool than it is from the push rod.

9. The test fixture apparatus of claim 1, further comprising a removable part holder.

10. The test fixture apparatus of claim 9, wherein the removable part holder comprises an insertion well located below at least a portion of the push rod.

* * * * *